United States Patent [19]

Doutsubo

[11] Patent Number: 4,663,673
[45] Date of Patent: May 5, 1987

[54] APPARATUS FOR DISCRIMINATING THE RECORDING MODE OF ONE OF A PLURALITY OF RECORDING MODES AND FOR REPRODUCING THE MAGNETICALLY RECORDED VIDEO SIGNAL

[75] Inventor: Nobuhide Doutsubo, Daito, Japan

[73] Assignee: Sanyo Electric Co., Ltd., Osaka, Japan

[21] Appl. No.: 697,100

[22] Filed: Feb. 1, 1985

[30] Foreign Application Priority Data

Feb. 16, 1983 [JP] Japan ................................. 58-25071

[51] Int. Cl.$^4$ ..................... G11B 15/087; G11B 15/44
[52] U.S. Cl. ................................... 360/9.1; 360/33.1; 360/10.2; 360/73
[58] Field of Search ...................... 360/9.1, 10.1, 10.2, 360/10.3, 33.1, 27, 70, 73, 77; 358/323, 321

[56] References Cited

U.S. PATENT DOCUMENTS

| | | | |
|---|---|---|---|
| 4,297,733 | 10/1981 | Sanderson | 360/70 |
| 4,364,097 | 12/1982 | De Boer et al. | 360/70 |
| 4,393,420 | 7/1983 | Tomizawa | 360/73 |
| 4,497,000 | 1/1985 | Terada et al. | 360/77 |
| 4,550,345 | 10/1985 | Terada et al. | 360/27 |
| 4,568,986 | 2/1986 | Furuhata et al. | 360/10.3 |
| 4,594,618 | 6/1986 | Kozuki et al. | 360/73 |

OTHER PUBLICATIONS

"A Recording Tape Speed Discrimination System for 8mm Video", Azuma et al, 1984, National Meeting of Japan Television Society.

Primary Examiner—Raymond F. Cardillo
Assistant Examiner—Robert A. Weinhardt
Attorney, Agent, or Firm—Armstrong, Nikaido, Marmelstein & Kubovcik

[57] ABSTRACT

An apparatus for reproducing a video signal is adapted to provide a reference signal $f_1$ corresponding to the frequency of a first pilot signal $f_1$, in the field period at the time of standard reproducing or in the frame period at the time of long playing reproducing, at the timing of scanning the center portion of a reproducing track by reproducing heads to be mixed with the reproduced pilot signal, and to determine the beat level of the fundamental wave of the error signal while sample-holding the obtained error signal, thereby to discriminate the recording mode by determining the period of this fundamental wave as a function of the rotation detecting output of the capstan. For this purpose, the sampling pulse is provided by means of a first variable frequency dividing circuit and a reference signal generating circuit, so that at the time of standard reproducing, the reference signal $f_1$ corresponding to the frequency of the first pilot signal $f_1$ may be fed in the field period and the beat signal may be sampled in the field period, and at the time of long playing reproducing, the signal may be fed and the sampling pulse may be provided in the frame period.

5 Claims, 13 Drawing Figures

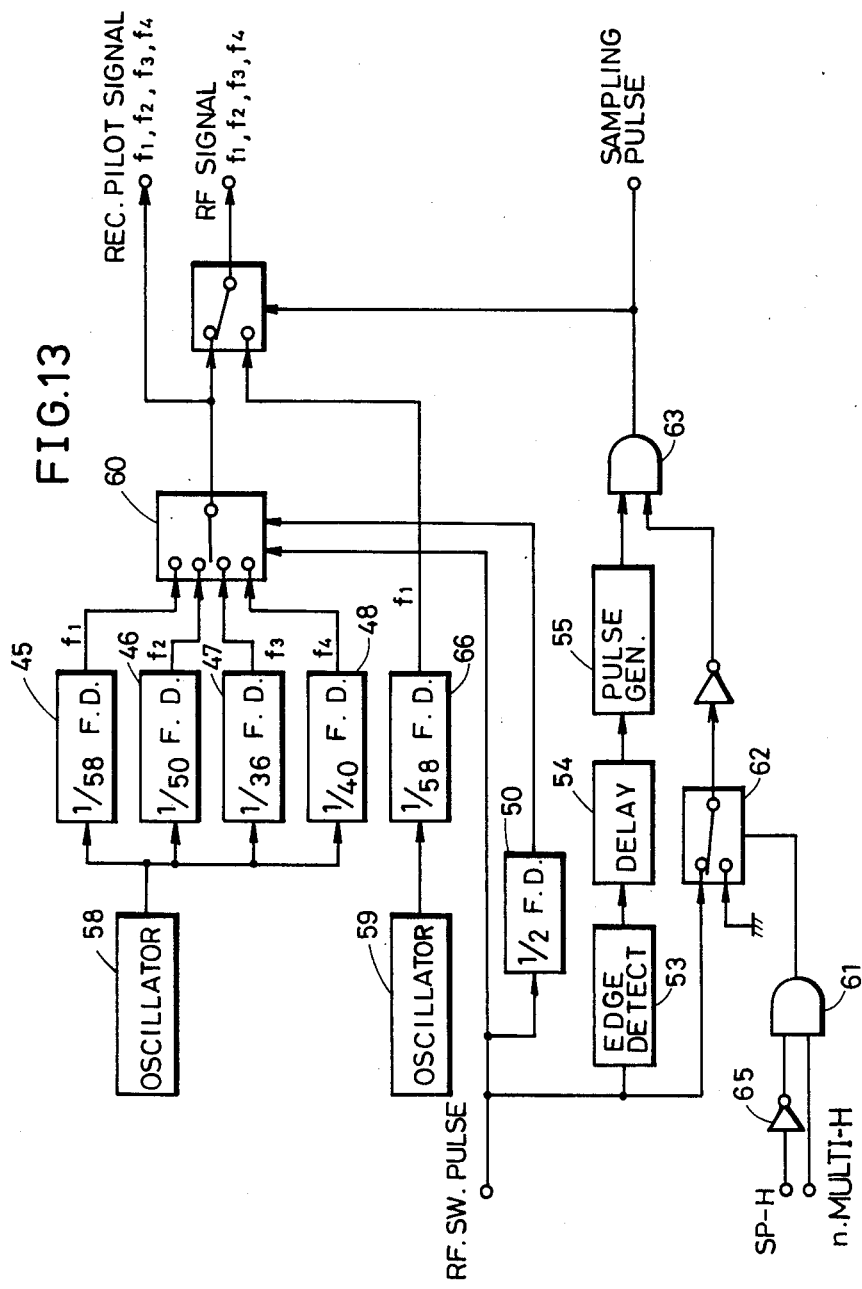

APPARATUS FOR DISCRIMINATING THE RECORDING MODE OF ONE OF A PLURALITY OF RECORDING MODES AND FOR REPRODUCING THE MAGNETICALLY RECORDED VIDEO SIGNAL

BACKGROUND OF THE INVENTION

1. Field of the Invention

This invention relates to an apparatus for reproducing a video signal which is recorded in one of a plurality of recording modes on a recording medium such as a magnetic tape, which can discriminate the recording mode automatically so as to change over the reproducing speed accordingly. More specifically, this invention relates to automatic discrimination of the recording mode in an apparatus of the so-called pilot signal system, in which a magnetic tape is used as a magnetic recording medium, and pilot signals for tracking control are recorded in the magnetic tape in superposition on the video signal, in place of tracks in which a tracking control signal is recorded.

2. Description of the Prior Art

A method of tracking control by the pilot signal system is proposed in the U.S. Pat. No. 4,297,733.

As a magnetic recording and reproducing apparatus employing the pilot signal system for tracking control, recently a small-sized magnetic recording and reproducing apparatus called "8 mm VIDEO" is attracting a keen attention. This small-sized magnetic recording and reproducing apparatus includes a standard recording mode and a standard reproducing mode at a standardized playing tape speed, and a long playing recording mode and a long playing reproducing mode at a half of the standard playing tape speed for long-term recording and reproducing. Accordingly, in reproducing, it is necessary to discriminate at which recording mode the video signal has been recorded.

In a VHS type magnetic recording and reproducing apparatus or a BETA type magnetic recording and reproducing apparatus presently available on market, the recording mode is discriminated by the reproduced control signal for tracking control which is detected from the control track in the magnetic tape, and the reproducing speed is automatically changed over.

However, in the 8 mm VIDEO employing the pilot signal system for tracking control, the magnetic tape does not have control track. Therefore, in order to discriminate the recording mode automatically, it is necessary to provide a new circuit not relying on the reproduced control signal.

An example of a circuit for automatically discriminating the recording speed at the time of the reproducing mode in the 8 mm VIDEO of interest to the present invention was publicized as "A Recording Tape Speed Discrimination System For 8 mm VIDEO" by Mr. Nobuo Azuma and his colleagues of Hitachi Ltd. at the 1984 national meeting of Japan Television Society. However, there exists a disadvantage in that this circuit requires a mixing circuit and other circuits for discrimination, and that the circuit configuration becomes rather complicated.

SUMMARY OF THE INVENTION

It is therefore an object of this invention to provide an apparatus for reproducing a video signal performing tracking control in reproducing by the pilot signal system, which is capable of automatically discriminating the recording mode by making use of the pilot signals for tracking control.

In short, this invention is characterized by an apparatus for reproducing a video signal adapted for discriminating the recording mode according to a variation in a beat level of an error signal obtained by mixing the reproduced pilot signals and a reference signal of a specific frequency which is momentarily inserted as a function of the field cycle.

In accordance with this invention, in a normal reproducing mode, discrimination is made of the standard recording mode or the long playing recording mode, and the reproducing speed can be changed over automatically to be adapted to the discriminated recording mode. Furthermore, in accordance with this invention, not only in the normal reproducing mode, but also in the fast forward reproducing mode or the rewinding reproducing mode at a speed of odd-number multiples of the normal reproducing mode, the recording mode can be successfully discriminated.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a detailed block diagram showing another example of a reference signal generating circuit and a first variable frequency dividing circuit shown in FIG. 9.

Figure 1:
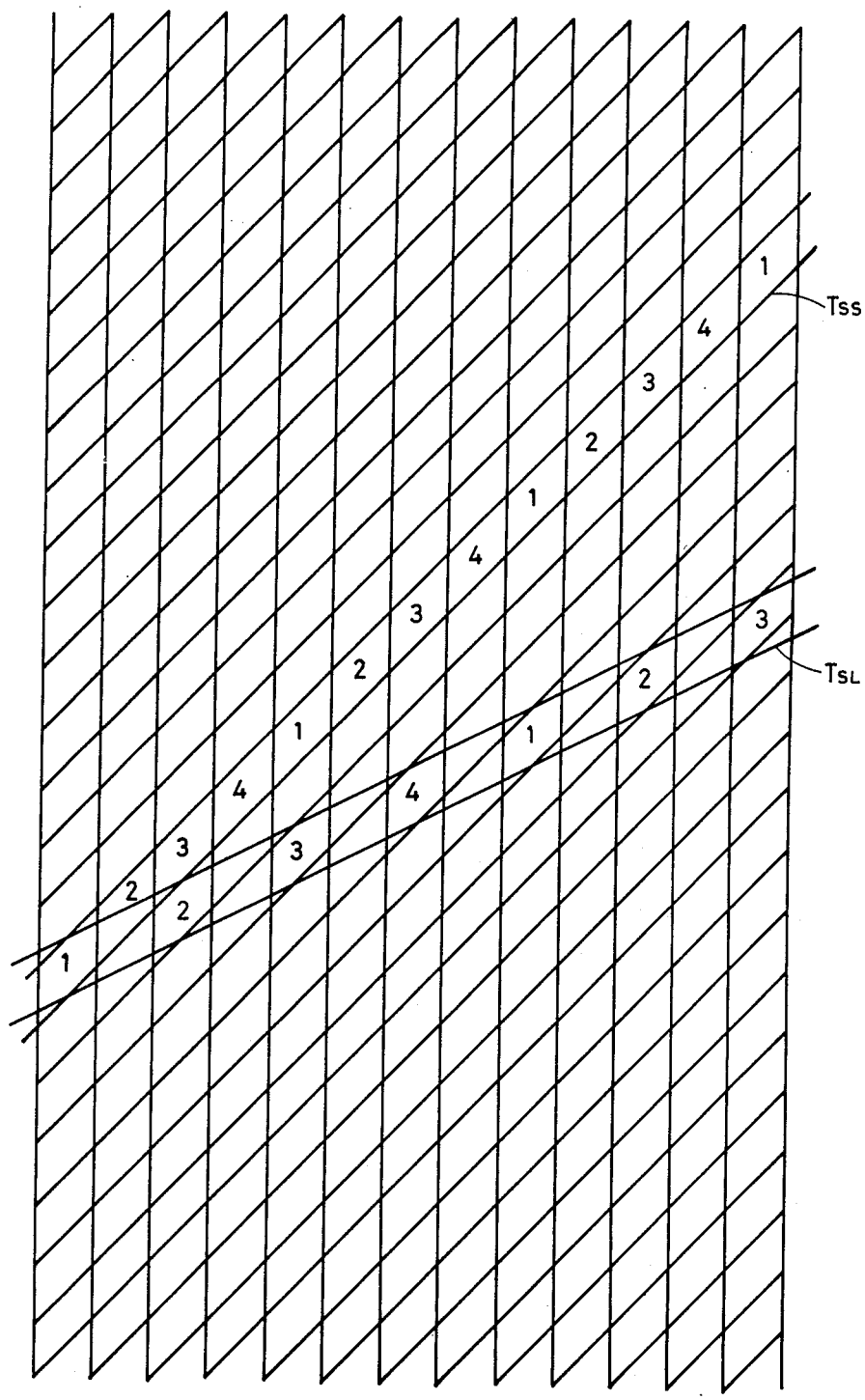
FIG. 1 is a diagram of the normal reproducing mode scanning traces of a standard recording mode tape.

DESCRIPTION OF THE PREFERRED EMBODIMENTS (1) Outline of 8 mm VIDEO

One of the embodiments of the present invention is described hereunder taking the case of the 8 mm VIDEO.

The 8 mm VIDEO is a recording and reproducing apparatus wherein an 8 mm wide magnetic tape for recording a video signal is used, a cassette of which is approximately the same as the size of an audio compact cassette, and is so called by the press because it is comparable to an 8 mm movie camera.

In the 8 mm VIDEO, four kinds of pilot signals $f_1$, $f_2$, $f_3$, $f_4$ for tracking different in their frequencies are used for tracking control. The pilot signals $f_1$ to $f_4$ are changed over for each field period, and are superposed and recorded onto a video track and a PCM track. The frequencies of the pilot signals are selected at 102.544 KHz for the first signal $f_1$, 118.951 kHz for the second signal $f_2$, 165.210 kHz for the third signal $f_3$, and 148.689 kHz for the fourth signal $f_4$, respectively. On the video track, the pilot signals are recorded in a specified order so that the difference in frequency from the pilot signal of the adjacent tracks may be approximately 16 kHz on the one side and approximately 46 kHz on the other side.

Tracking control at the time of reproducing mode is performed in the following manner. While the reproducing track is being traced by the reproducing heads, the pilot signals recorded at both tracks adjacent to both sides of the track being traced are also somewhat read by the side read effect of the reproducing heads. For example, when the pilot signal $f_1$ is recorded in the reproducing track, the pilot signals $f_4$, $f_2$ recorded in both side adjacent tracks are read out in addition to the pilot signal $f_1$. A reference signal $f_1$ having a frequency coinciding with the first pilot signal $f_1$ is mixed with the pilot signals being read out. As a result, the 46 kHz beat signal and the 16 kHz beat signal are generated due to the reference signal $f_1$ and the pilot signals $f_4$, $f_2$ as the crosstalk components from the adjacent tracks. Accordingly, a tracking error can be detected by comparing the levels of the 46 kHz beat signal and the 16 kHz beat signal. More specifically, as far as the reproducing heads are tracing the predetermined tracks exactly, the levels of the crosstalk pilot signals being read out from both sides tracks are equal to each other, so that the levels of the 46 kHz beat signal obtained by mixing are crosstalk pilot signal and the reference signal and the 16 kHz beat signal obtained by mixing other crosstalk pilot signal and the reference signal are equal to each other. On the other hand, when the reproducing heads are deviated to either track side, the level balance of the beat signals is lost so that a tracking error may be detected.

(2) Summary of the Embodiment

This embodiment is intended to discriminate the recording mode by providing a reference signal generating circuit by which, in addition to the feeding of the reference signals for tracking control as described above, the reference signal $f_1$ of a frequency equal to the first pilot signal $f_1$, is also fed at the timing of scanning the center portion of each reproducing track by the reproducing heads, and by detecting the beat level of the error signal obtained by mixing the reference signal $f_1$ and the reproduced pilot signals $f_1$ to $f_4$.

(3) Description of the Principle of Recording Mode Discrimination

The principle of this recording mode discrimination is described hereunder. For the sake of simplicity, however, instead of feeding the specified reference signal $f_1$ at the timing of scanning of the center portion of the reproducing track by the reproducing heads, the principle is described assuming that the reference signal $f_1$ for recording mode discrimination be fed in all portions of the reproducing tracks.

Figure 2:
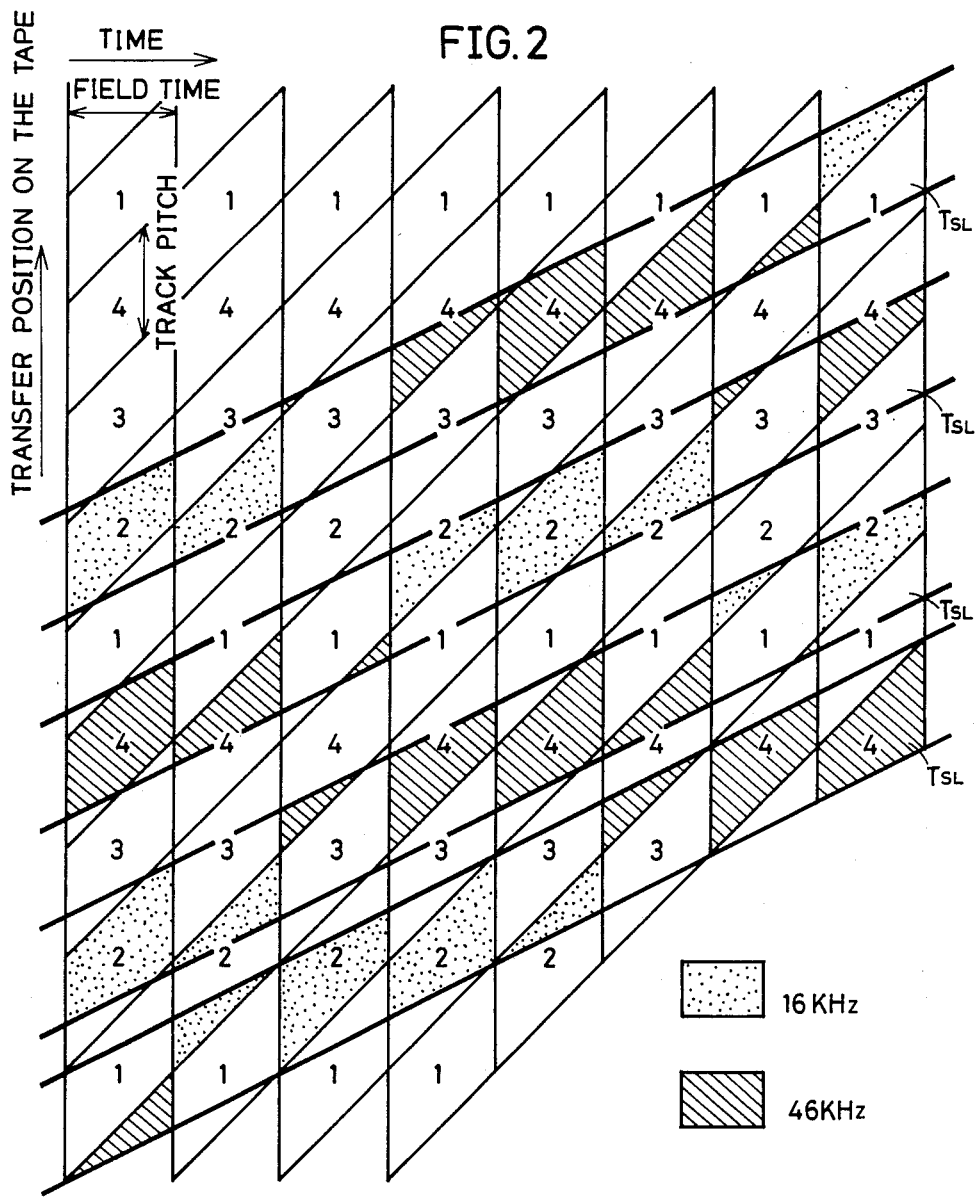
FIG. 2 is a enlarged view of the principal part of FIG. 1.
Figure 3:
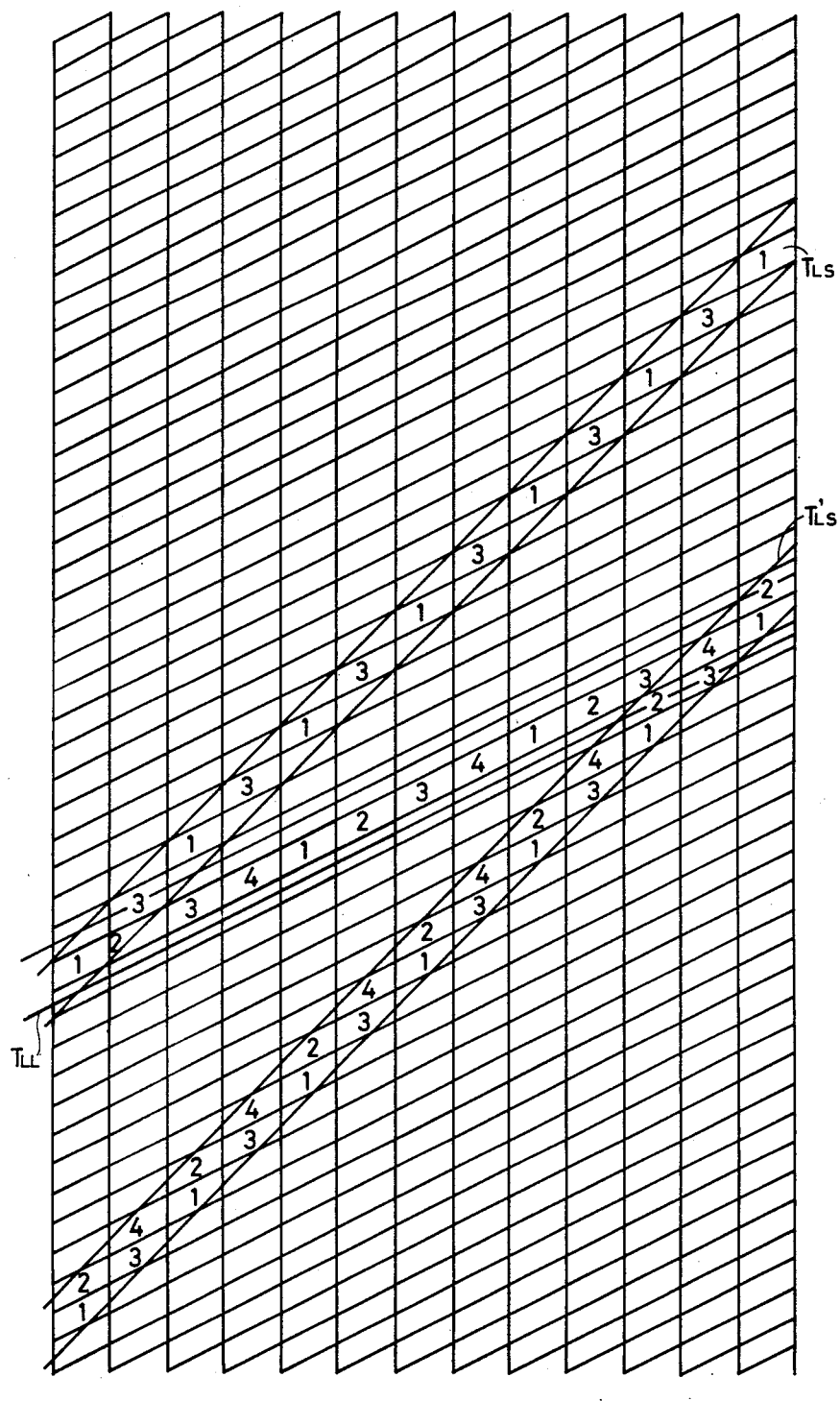
FIG. 3 is a diagram of the normal reproducing mode scanning traces of a long playing recording mode tape.
Figure 4:
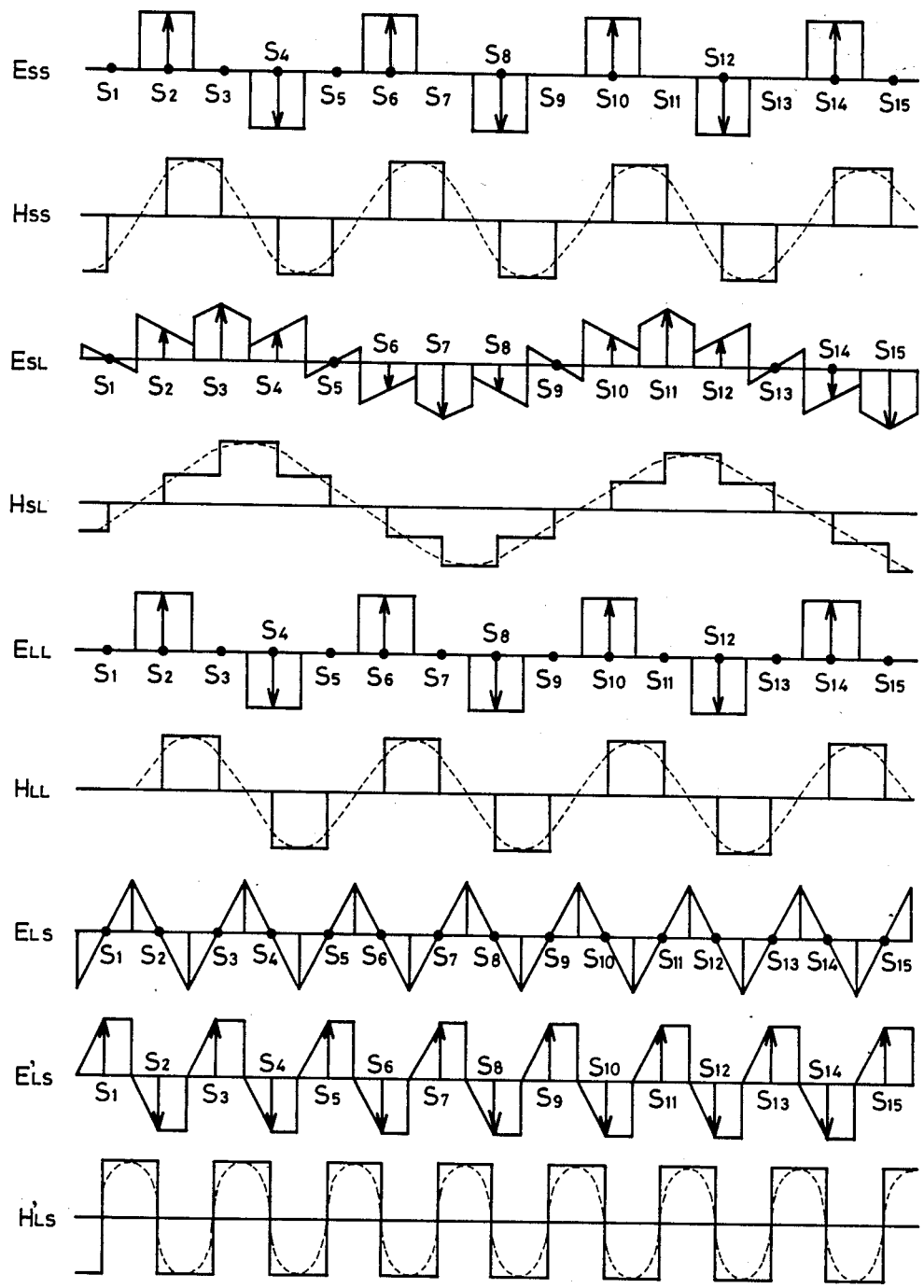
FIG. 4 shows signal waveforms corresponding to the scanning traces of FIGS. 1 and 3.

(3-a) In the case of the normal reproducing mode:

FIGS. 1 to 4 are diagrams showing the normal reproducing mode. FIG. 1 is a diagram of a scanning pattern showing the scanning trace by the reproducing heads when a standard recording mode tape is reproduced at the standardized playing tape speed and the scanning trace by the reproducting heads when the same tape is reproduced at a half of the standard playing tape speed. FIG. 2 is an enlarged view of the essential part of FIG. 1, in which the tracks for generating the beat signals between the pilot signals and the reference signal $f_1$ are indicated by hatching and dots. FIG. 3 is a diagram of a scanning pattern showing the scanning trace by the reproducing heads when a long playing recording mode tape is reproduced in the long play reproducing mode and the scanning trace by the reproducing heads when the same tape is reproduced in the standard reproducing mode. FIG. 4 shows waveforms of the error signals and others generated in the scanning patterns shown in FIGS. 1 and 3.

The track patterns in FIGS. 1 to 3 are drawn, in a manner different from the representing method conventionally employed as recording patterns on the tape of a video tape recorder of a helical scan system. This track pattern representing method is called as "the track pattern coordinate method". This method of representation was proposed by Nobuyoshi Kobori et al. in the "National Technical Report," Vol. 28, No. 3, June 1982.

In the track pattern cordinate method, vertical lines indicate the tapes and the tapes in longitudinal direction are placed side by side in transversal direction. The track patterns drawn on the tapes inclined upward to the right are slipped off by one track pitch as tapes are moved from left to right. By this coordinate method, therefore, the track patterns and the head scanning traces can be taken as the locus of continuous lines. Moreover, the time and the head transfer on the tape can be known at a glance because the axis of abscissa indicates time and the axis of ordinate shows transfer position on the tape.

Referring now to FIG. 1, the reference code $T_{SS}$ denotes the scanning trace of the reproducing heads when the apparatus is reproducing the standard recording mode tape at the standard speed, whereas the reference code $T_{SL}$ denotes the scanning trace of the reproducing heads when the apparatus is reproducing the standard recording mode tape at the long playing speed.

Before entering into further description, given below are the rules of reference codes representing the recording mode and the reproducing mode appearing hereinafter. The reference codes specifying the recording mode and the reproducing mode are used hereinafter in accordance with the following rules. Taking the case of the scanning trace $T_{SL}$, for example, the first subscript denotes the recording mode (in this case "S" standing for the standard mode), and the second subscript indicates the reproducing mode (in this case "L" standing for the long playing mode).

Therefore, in any reference code, the first and second subscripts must be either "S" or "L" according to the recording or reproducing mode.

In the case of the scanning trace $T_{SS}$, when the reference signal $f_1$ corresponding to the frequency of the first pilot signal $f_1$ is continuously fed into the reproduced pilot signal, an error signal composed of beats of 46 kHz and 16 kHz due to the reference signal $f_1$ and reproduced pilot signals $f_1$ to $f_4$ is expressed as $E_{SS}$ as shown in FIG. 4. More specifically, when the reproducing heads trace the tracks in which the pilot signal $f_2$ denoted by the reference numeral 2 is recorded, a positive beat component of 16 kHz occurs, and when they trace the tracks in which the pilot signal $f_4$ denoted by the reference numeral 4 is recorded, a negative beat component of 46 kHz is generated.

Similarly, in case that the reproducing heads are scanned along the scanning trace $T_{SL}$, an error signal of 46 kHz is generated when the track region indicated by hatching in FIG. 2 is scanned, while an error signal of 16 kHz is generated when the track region indicated by dots is scanned, and the signal waveform becomes $E_{SL}$ as shown in FIG. 4.

At the timing of scanning the center portion S1, S2 . . . of each track, when the error signal is held as sampled in the field period, the sampled waveforms become $H_{SS}$, $H_{SL}$ as shown in FIG. 4. Referring to FIG. 4, it is known that the fundamental wave component of the sampled waveform $H_{SS}$ is of 4-field period in the standard reproducing mode, and that of the sampled waveform $H_{SL}$ is of 8-field period in the long playing reproducing mode.

In the same manner, referring now to FIG. 3, the reference code $T_{LL}$ denotes the scanning trace of the reproducing heads when reproducing the long playing recording mode tape at the long playing speed, whereas the reference codes $T_{LS}$ and $T'_{LS}$ represent the scanning traces of the reproducing heads when reproducing the long playing recording mode tape at the standard speed. In these scanning traces, when the reference signal $f_1$ corresponding to the frequency of the first pilot signal $f_1$ is fed in the same manner as above, the waveform of the obtained error signal is as shown as $E_{LL}$ in FIG. 4 in the case of scanning trace $T_{LL}$, is as shown as $E_{LS}$ in the case of scanning trace $T_{LS}$, and is as shown as $E'_{LS}$ in the case of scanning trace $T'_{LS}$. Based on these waveforms, when holding as sampled by feeding the reference signal $f_1$ only at the timing of scanning the center portion S1, S2, . . . of each track, a sampled as indicated by $H_{LL}$ in the long playing reproducing mode, while in the standard reproducing mode either no output is obtained or the sampled output as indicated by $H'_{LS}$ is obtained. In this case, the sampled output disappears in the standard reproducing mode only when the reproducing tracks and the reproducing heads are temporarily situated in a particular relation, but it does not matter in ordinary scanning trace as indicated by $T'_{LS}$ when the timing of scanning of the reproducing heads is deviated.

It is noted that these sampled outputs, as indicated by doted line, have the fundamental wave component of 4-field period in the long playing reproducing mode, and 2-field period in the standard reproducing mode.

As is clear from the relation described above, when the recorded tape is reproduced in due reproducing speed, i.e., in the same mode as the recording mode, the fundamental wave of sampled output is 4-field period long. However, when the reproducing speed is twice the due speed, i.e., when a magnetic tape recorded in the long playing recording mode is reproduced in the standard reproducing mode, the fundamental wave of error output is 2-field period long. To the contrary, when the reproducing speed is half the due speed, i.e., when a tape recorded in the standard recording mode is reproduced in the long playing reproducing mode, the fundamental wave of sampled output is 8-field period long. Therefore, by detecting this relation and changing over the reproducing mode automatically, an adequate reproducing mode may be achieved.

(3-b) In the case of the special reproducing mode:

Now discussion is made of the case of the fast forward reproducing mode, for example, a triple speed fast forward reproducing (cue reproducing).

Figure 5:
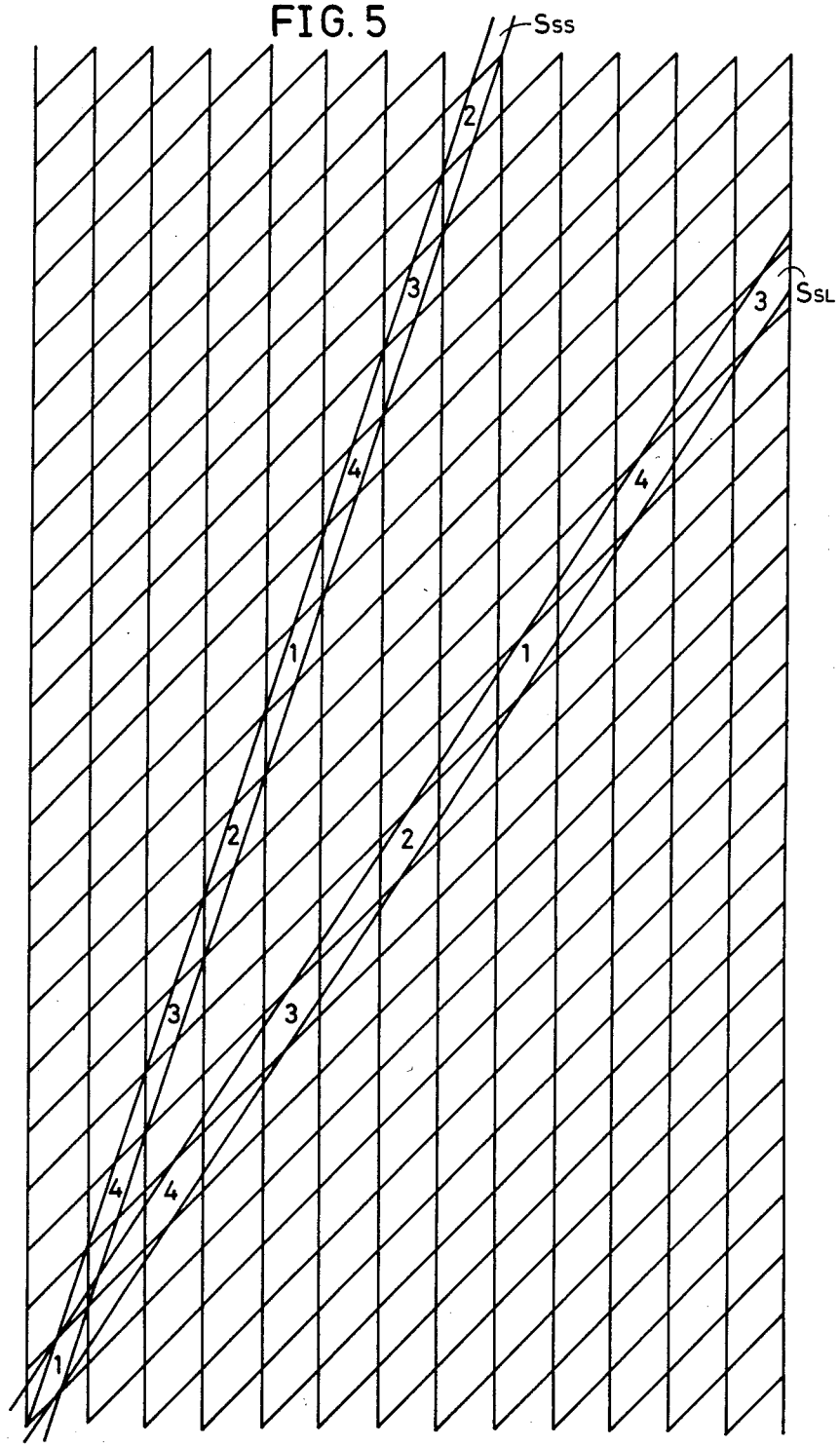
FIG. 5 is a diagram of the fast forward reproducing mode scanning traces of a standard recording mode tape.
Figure 6:
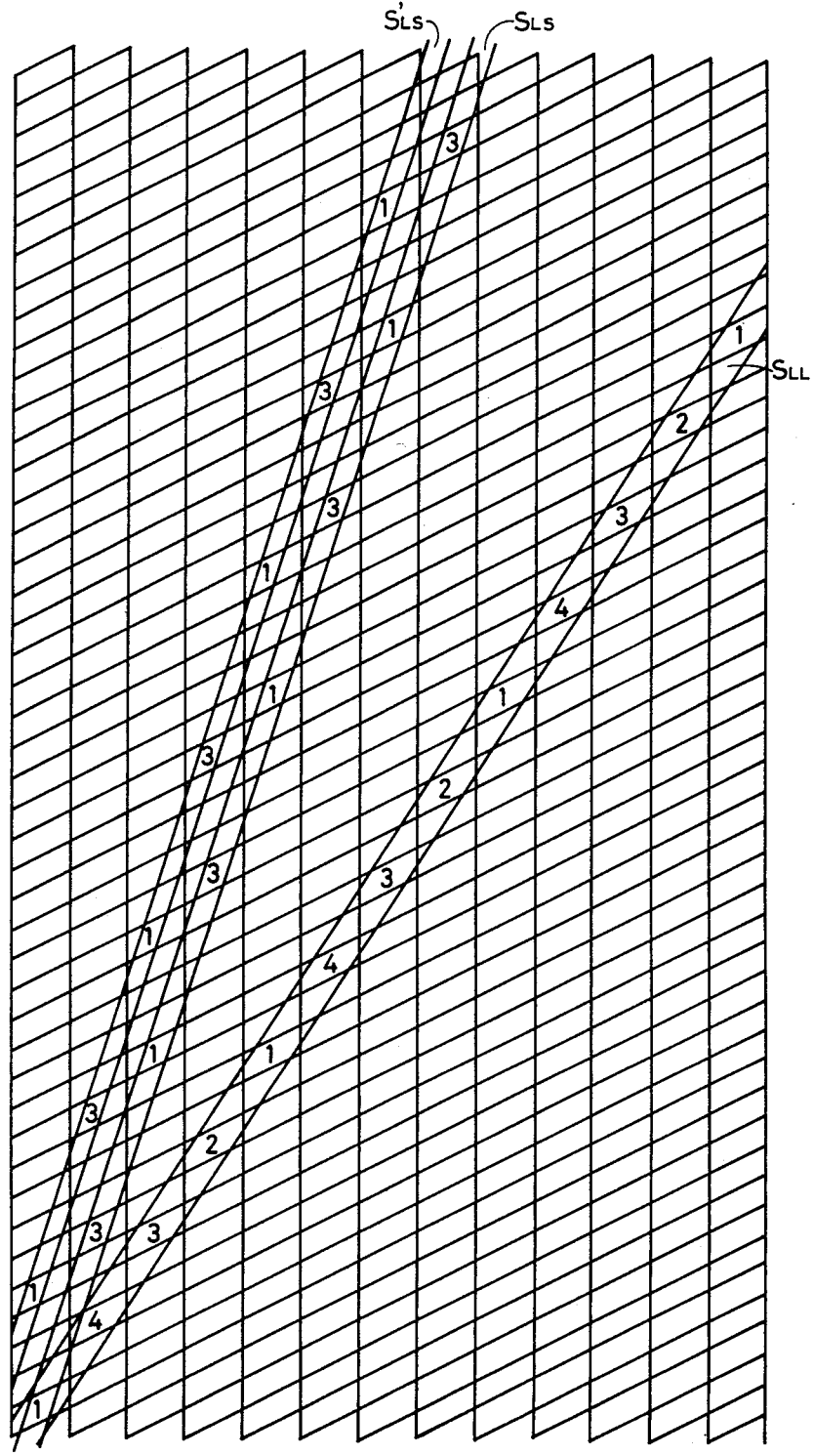
FIG. 6 is a diagram of the fast forward reproducing mode scanning traces of a long playing recording mode tape.
Figure 7:
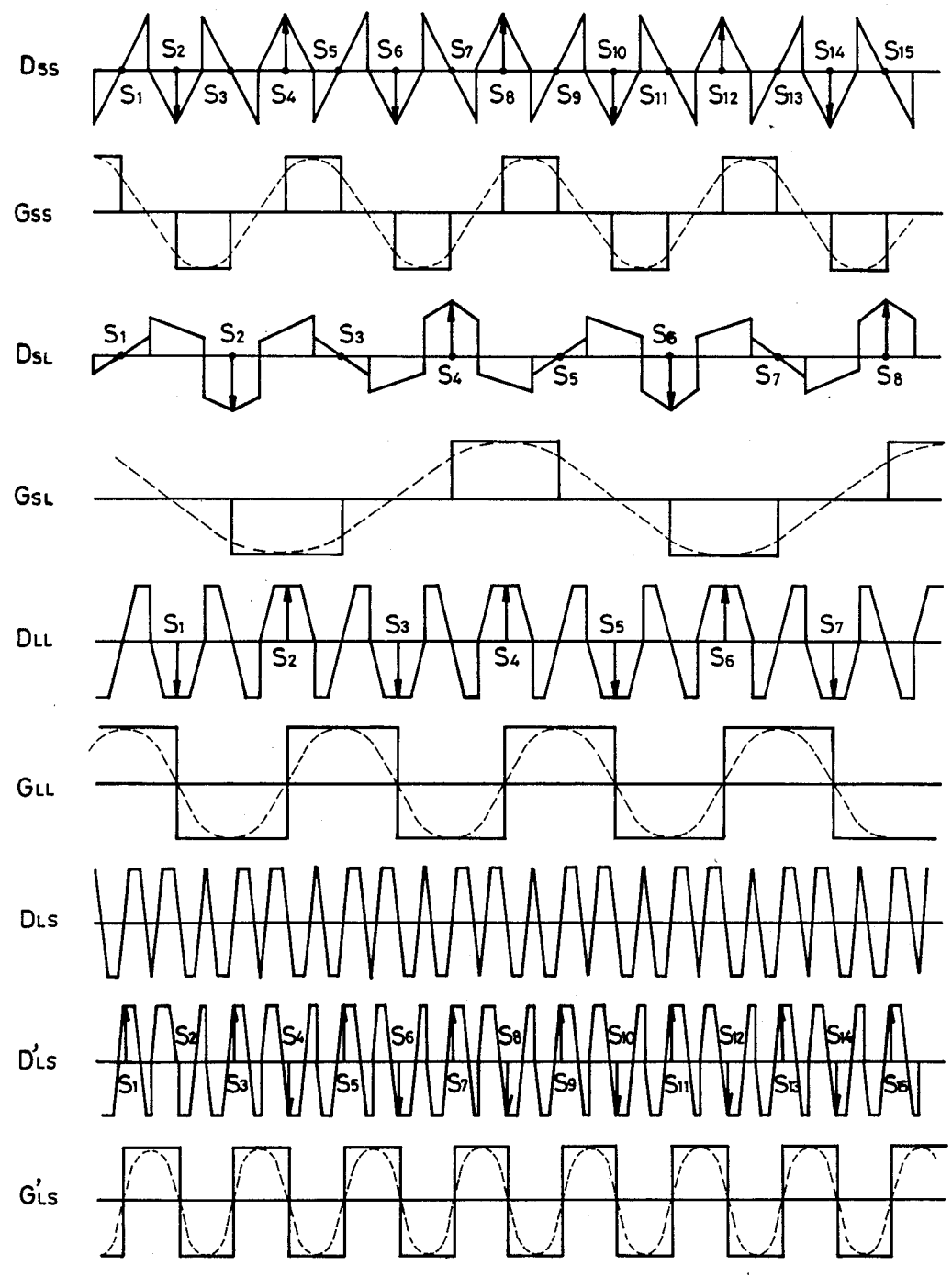
FIG. 7 shows signal waveforms corresponding to the scanning traces of FIGS. 5 and 6.

FIG. 5 is a diagram of cue scanning traces of the reproducing heads on the standard recording mode tape, FIG. 6 is a diagram of cue scanning traces of the reproducing heads on the long playing recording mode tape, and FIG. 7 is a diagram of the output waveform when the reproducing heads scan each cue scanning trace.

Referring first to FIG. 5, the cue scanning trace $S_{SS}$ is the scanning trace of the reproducing heads when reproducing the standard recording mode tape at an ordinary cue reproducing speed (three times as much as the standard reproducing speed). By continuously mixing the reference signal $f_1$ corresponding to the frequency of the first pilot signal $f_1$ with the reproduced pilot signal being read out when the reproducing heads scan this cue scanning trace $S_{SS}$, an error output $D_{SS}$ as shown in FIG. 7 is obtained. Accordingly, when the reference signal is fed only at the timing of scanning the center portion of each track, the error output $D_{SS}$ is held as sampled, so that the sampled pulse $G_{SS}$ of the error signal $D_{SS}$ comes to have a fundamental wave of 4-field period as shown in FIG. 7.

When the standard recording mode tape is reproduced at the cue speed of the long playing reproducing mode, i.e., at a speed three times the normal long playing reproducing speed, the cue scanning trace becomes the state as indicated as $S_{SL}$ in FIG. 5, and the error signal at this time is $D_{SL}$ in FIG. 7.

In this error output $D_{SL}$, however, no correlation can be found if sample-holding is performed in every field, as described above. In this case, accordingly, feeding of the reference signal $f_1$ and sample-holding must be carried out in the frame period, instead of the field period. The sampled waveform of the error output $D_{SL}$ in the frame period is shown as $G_{SL}$ in FIG. 7, and the period of its fundamental wave is 8 fields.

Referring then to FIG. 6, when the long playing recording mode tape is reproduced at the cue reproducing speed of the long playing reproducing mode along the scanning trace $S_{LL}$, and the reference signal $f_1$ is fed continuously, its error signal becomes as indicated as $D_{LL}$ in FIG. 7. Since this reproducing mode is the long playing reproducing mode, when the reference signal $f_1$ is fed in the frame period as above and the error signal is sample-held, the sampled output $G_{LL}$ with a 4-field period fundamental wave is obtained.

Further, when the tape in the long playing recording mode is reproduced at the cue speed of the standard reproducing mode along with the scanning trace $S_{LS}$ in FIG. 6, an error signal $D_{LS}$ is obtained as shown in FIG. 7. This error signal $D_{LS}$ is the output at specific points, and its sampled output is 0. Therefore, with respect to the ordinary reproducing scanning trace $S'_{LS}$ with the reproduced points deviated as shown in FIG. 6, an error signal $D'_{LS}$ is obtained as shown in FIG. 7. When a sampled signal as indicated as $G'_{LS}$ is obtained from this error signal $D'_{LS}$, the period of a fundamental wave component of the signal $G'_{LS}$ is 2 fields.

Judging from the above relation, as far as reproducing at the odd-number multiple speed is concerned, it is known that the fundamental wave period of the sampling output of the error output is specified to a certain period regardless of the multiple speed. More specifically, in the case of cue reproducing in the same mode as the recording mode, the fundamental wave of the sampling error output has a period of 4 fields, but when the mode of cue reproducing is different from the recording mode, the fundamental wave of the sampling output has a period of 2 fields or 8 fields. From this relation, accordingly, if a fundamental wave of a 2-field period is obtained from the sampled output, it is known that the reproducing mode should be changed to the long playing reproducing mode, or if a fundamental wave of 8-field period is obtained, it should be changed over to the standard reproducing mode. However, in the long playing reproducing mode, the sampling period thereof should be frame period.

Thus, this invention is characterized by discriminating the recording mode of the signal being recorded on the recording medium by identifying the period of the fundamental wave of the sampled output obtained according to the principle described hereabove.

Figure 8:
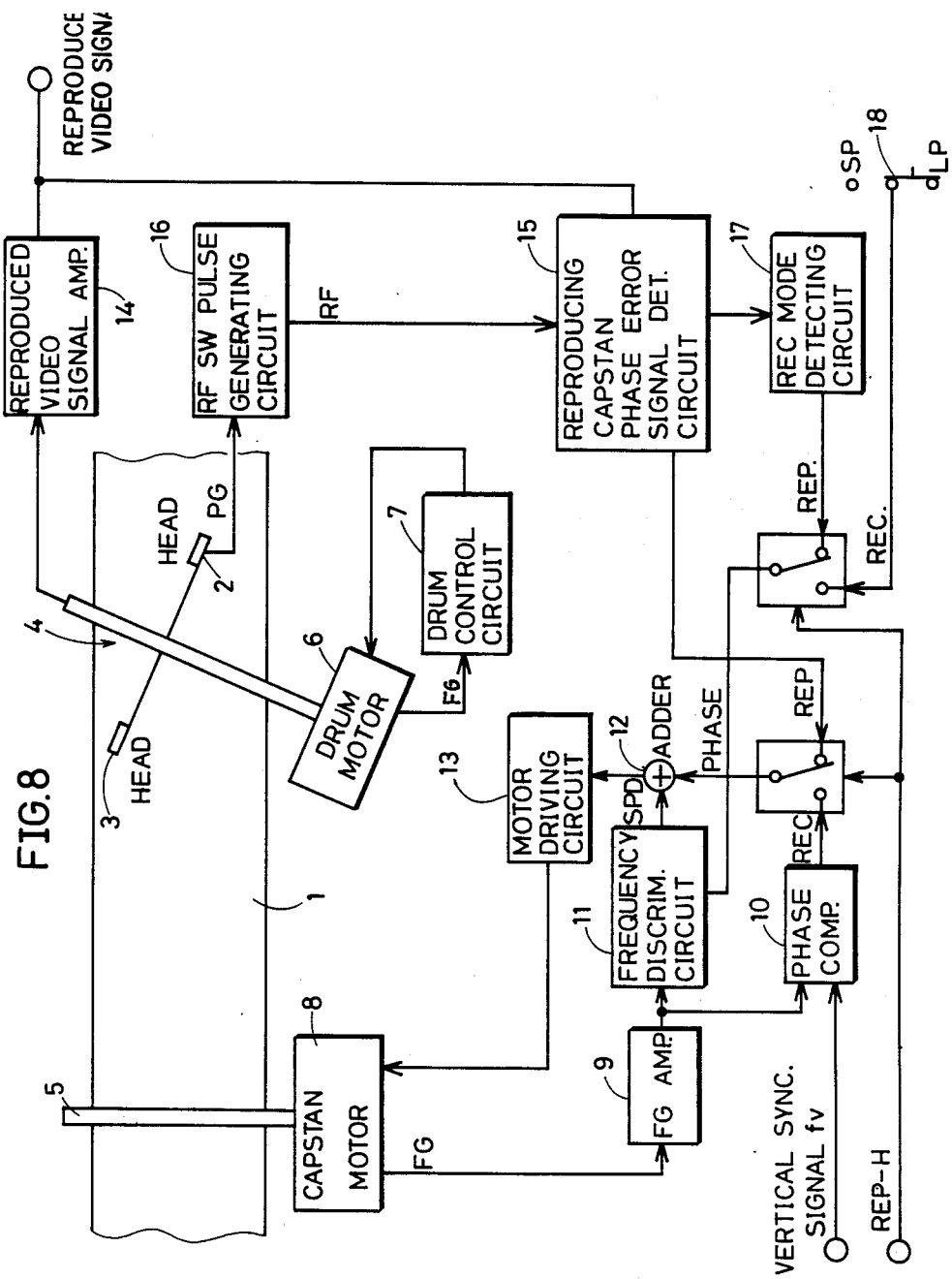
FIG. 8 is a block diagram of a servo control system of an embodiment of this invention.

(4) Description of Practical Circuit Blocks (4-a) Description of servo circuit system block diagram:

FIG. 8 is a servo circuit system block diagram of the 8 mm VIDEO to which one of the embodiments of this invention is designated. This 8 mm VIDEO can record and reproduce both in the standard mode and in the long playing mode. In the long playing mode, the transfer speed of the video tape is half that in the standard mode.

Referring to FIG. 8, a video tape 1 is helically wound on a rotating drum 4 on which heads 2, 3 are mounted, and is transferred at a constant speed by means of a capstan 5.

The rotating drum 4 is driven by a drum motor 6, and this drum motor 6 is controlled by a drum control circuit 7.

The capstan 5 is rotated by a capstan motor 8. The rotation of the capstan motor 8 is controlled in the manner to be described subsequently. That is, a rotation detecting pulse FG generated by the capstan motor 8 is amplified by a rotation detecting pulse amplifying circuit 9 and is applied to a phase comparator 10 and a frequency discriminating circuit 11. The phase comparator 10 compares the phases of the vertical synchronizing signal $f_V$ separated from the video signal to be recorded at the time of recording and the rotation detecting pulse FG. The frequency discriminating circuit 11 detects the speed from a period of the rotation detection pulse FG. The output from the comparator 10 and the output from the frequency discriminating circuit 11 are added in an adder 12, and the combined output of the adder 12 is applied to a motor driving circuit 13 as a control signal, so that the rotation of the capstan motor 8 is controlled at a predetermined constant speed by the circuit 13.

The signal reproduced by the heads 2, 3 is amplified by a reproduced video signal amplifying circuit 14 and is output to the output terminal as a reproduced video signal, while it is also applied to a reproducing capstan phase error signal detecting circuit 15. Besides, in response to the changeover of the heads 2, 3, a reference switching pulse RF is generated in a reference switching pulse generating circuit 16. In the reproducing capstan phase error signal detecting circuit 15 and recording mode detecting circuit 17, the phase output of the signal based on these two inputs is applied to the adder 12 at the time of reproducing and the recording mode is detected at the same time. The output of the recording mode detecting circuit 17 is applied to the frequency discriminating circuit 11 and the rotating speed of the capstan motor 8 is changed over depending on the recording mode.

Referring to FIG. 8, the reference code REP-H is a signal output by the manual changeover switch which becomes the high level in the reproduction mode. A switch 18 is a manual switch for selecting either the standard mode or the long playing mode in recording.

Figure 9:
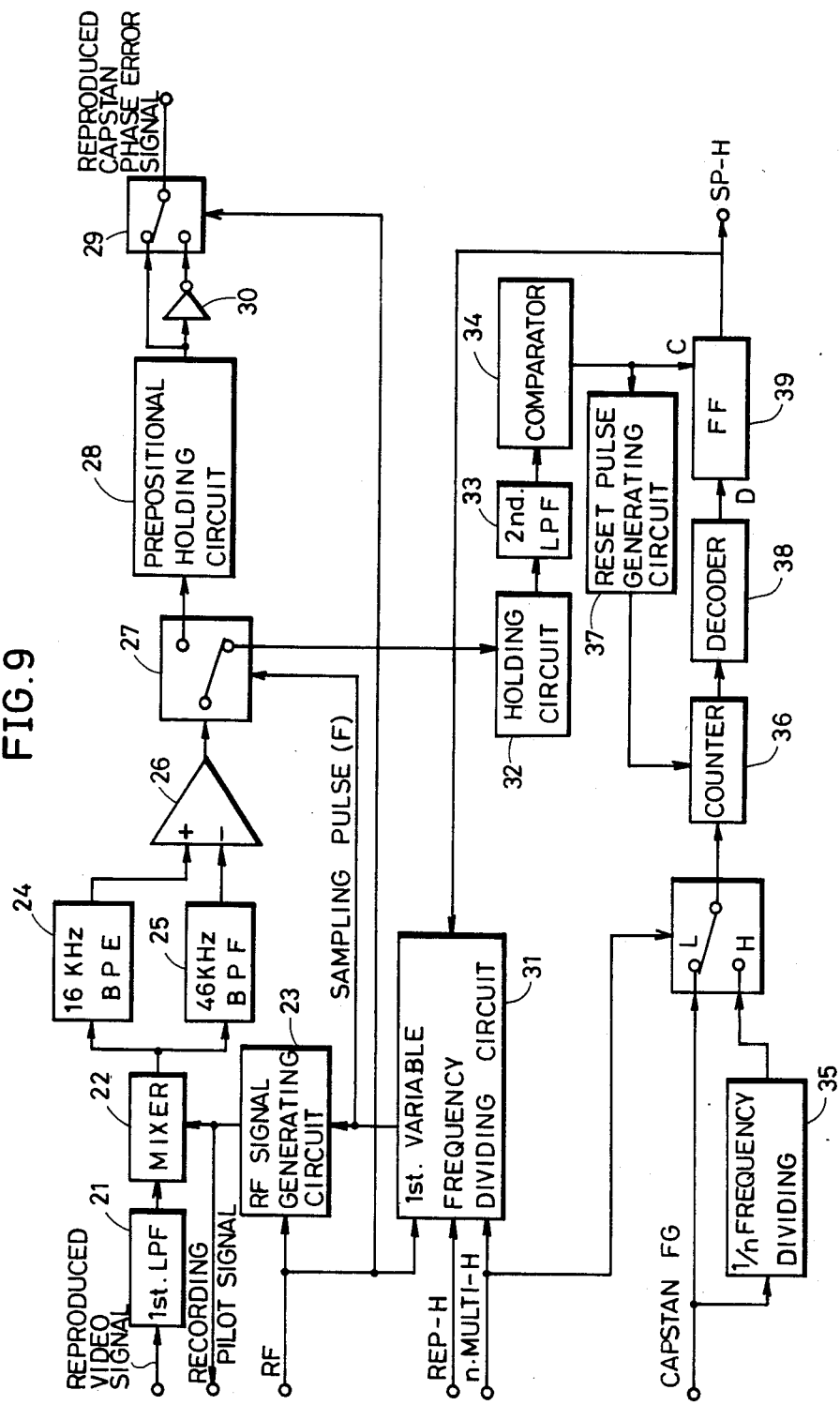
FIG. 9 is a block diagram of the circuit showing a principal part of the embodiment of this invention.

(4-b) Description of signal detecting and generating circuit block diagram:

FIG. 9 is a detailed block diagram describing the features of this embodiment, showing the details of the reproducing capstan phase error signal detecting circuit 15 and the recording mode detecting circuit 17 in FIG. 8.

Referring to FIG. 9, a first low pass filter 21 to which a reproduced video signal is supplied leads out the reproduced pilot signals comprising crosstalk components. The output of this filter 21 is mixed with the reference signals in a mixer 22 in the next state. The reference signals are supplied from a reference signal generating circuit 23. At this time, usually the reference signals are sequentially changed over to the frequency corresponding to the pilot signal which coincides with the pilot signal of the track being reproduced on the basis of the reference switching pulse RF (see FIG. 8).

Meanwhile, in the recording mode, the signals generated in the reference signal generating circuit 23 are output as recording pilot signals and are superposed on the video signal and recorded on the tape track.

The error signal obtained by mixing the crosstalk component of the reproduced pilot signals and the reference signals are separated by a 16 kHz band pass filter 24 and a 46 kHz band pass filter 25 and the levels of the outputs therefrom are compared in a comparator 26. The comparison output is fed into a prepositional holding circuit 28 through a first switching circuit 27, thereby leading out a holding output from the holding circuit 28 which is not interrupted by the switching of the first switching circuit 27. The polarity of the holding output led out from the prepositional holding circuit 28 is inverted in every field. To cancel this inversion, the direct holding output and the polarity inverted output inverted by an inverter 30 are fed to a second switching circuit 29 to be switched over. In consequence, the switching output is delivered as the phase control signal of the capstan motor 8 (see FIG. 8).

The aforementioned circuit is a known circuit in the 8 mm VIDEO and a further description thereof is omitted herein.

The gist of this embodiment resides in the following point. That is, in this embodiment, the reference signal $f_1$ corresponding to the frequency of the first pilot signal $f_1$ is led out at the timing of scanning the center portion of the video track in the field period in the standard reproducing mode or in the frame period in the long playing reproducing mode, and is mixed with the reproduced pilot signals for obtaining the fundamental wave of the error signal and for sample-holding the obtained fundamental wave, and by determining this fundamental wave period by counting the number of the rotational detecting output of the capstan, the recording mode is discriminated depending on the count.

For this purpose, the arrangement is made such that the reference signal $f_1$ corresponding to the first pilot signal $f_1$ is fed in the field period at the time of the standard reproducing mode by means of the first variable frequency dividing circuit 31 and the reference signal generating circuit 23, while the sampling pulse is output so that the error signal may be sampled in the field period and at the time of the long playing reproducing mode, the feeding of the signal and output of sampling pulse is performed in the frame period.

Figure 10:
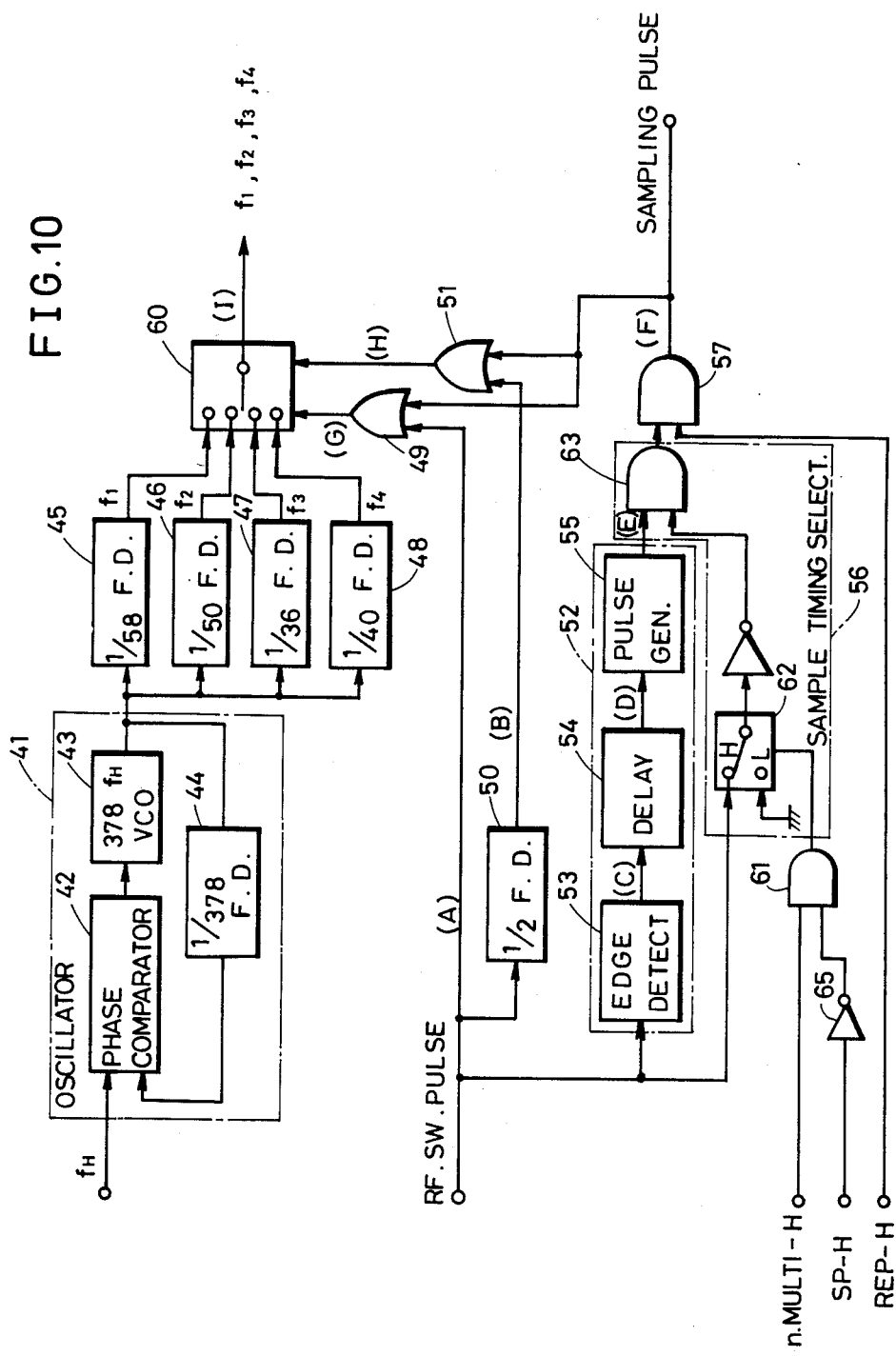
FIG. 10 is a detailed block diagram showing an example of a reference signal generating circuit 23 and a first variable frequency dividing circuit 31 shown in FIG. 9.
Figure 11:
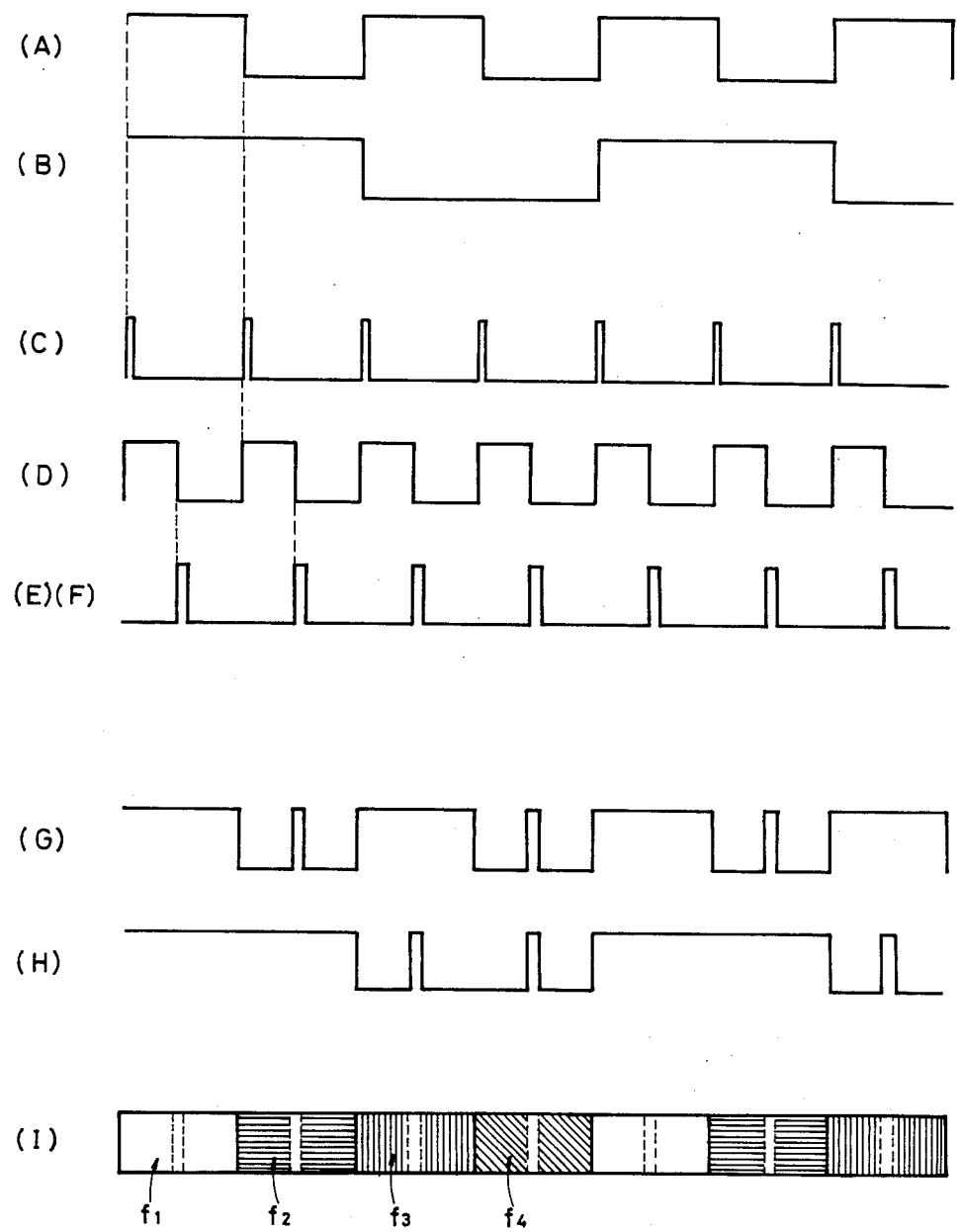
FIG. 11, consisting of (A)-(I), shows a waveform of the output from each circuit of FIG. 10 when sampling is made in the field cycle.
Figure 12:
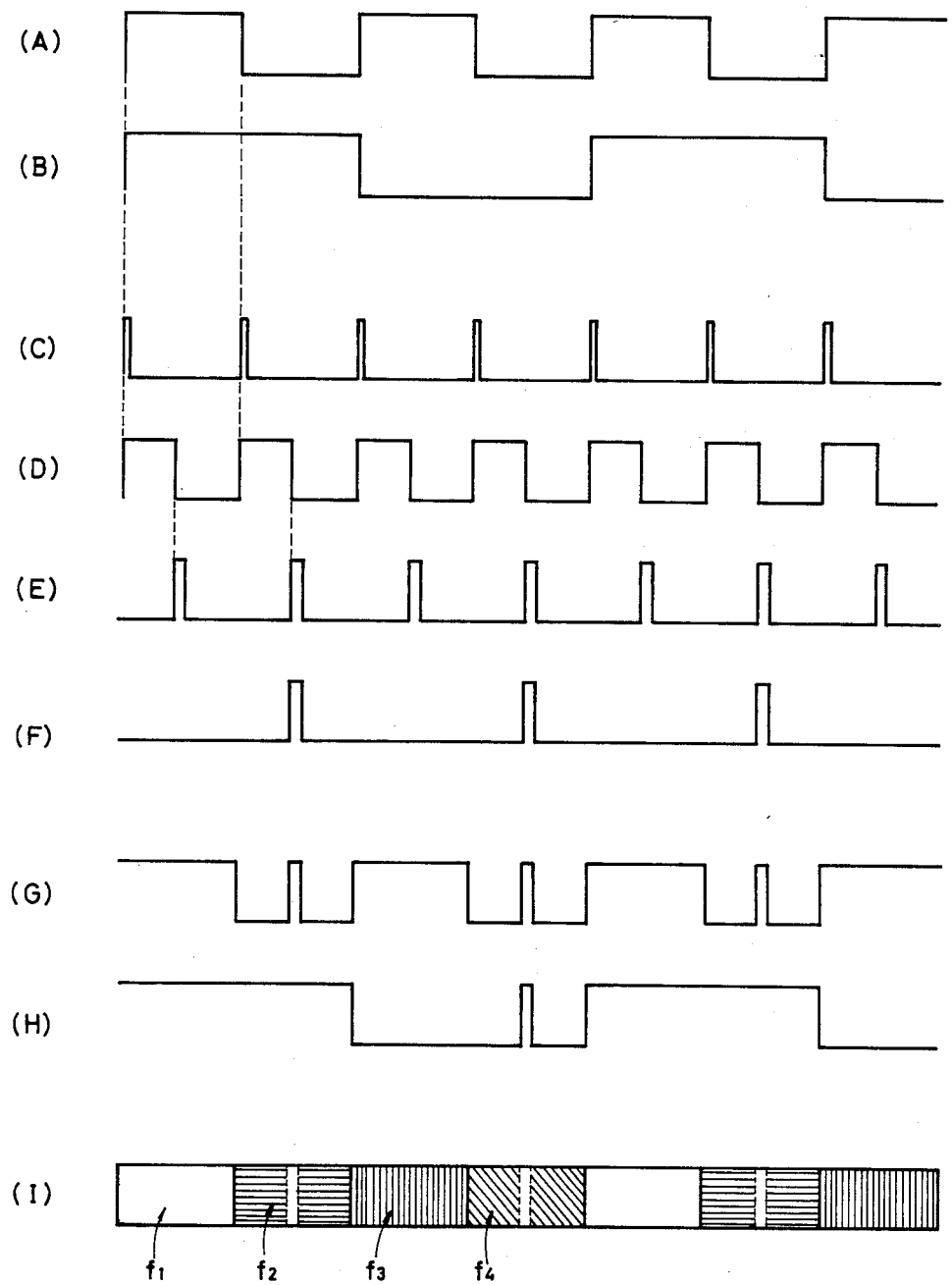
FIG. 12, consisting of (A)-(I), shows a waveform of the output from each circuit of FIG. 10 when sampling is made in the frame cycle.

(4-c) Description of reference signal $f_1$ and sample hold pulse output circuit:

FIG. 10 is a detailed block diagram showing an example of a practical configuration of the first variable frequency dividing circuit 31 and the reference signal generating circuit 23. FIGS. 11 and 12 show signal waveforms in reproduction at points (A) to (I) in FIG. 10. Specifically, FIG. 11 is a waveform diagram in the case of sampling in the field period, and FIG. 12 is a waveform diagram showing the sampling in the frame period.

Referring to FIGS. 10 to 12, a horizontal synchronizing signal $f_H$ which is separated from the video signal to be recorded at the time of the recording mode and is separated from the video signal to be reproduced at the time of the reproducing mode is converted to a reference frequency signal of 378 $f_H$ in an oscillating circuit 41 to be output therefrom. The oscillating circuit 41 is comprised of a phase comparator 42, a voltage controlled oscillator 43 and a 1/378 frequency divider 44, which are combined to form a phase loop circuit.

The reference frequency signal output from the oscillating circuit 41 is applied to a 1/58 frequency divider 45, a 1/50 frequency divider 46, a 1/36 frequency divider 47 and a 1/40 frequency divider 48 to become $f_1$, $f_2$, $f_3$ and $f_4$ signals respectively, which are supplied to a selector 60. The signals $f_1$ to $f_4$ are the recording pilot signals at the time of the recording mode, and are the reference signals to be applied to the mixer 22 at the time of the reproducing mode.

The reference switching pulse RF (A) supplied from the reference switching pulse generating circuit 16 (see FIG. 8) is directly applied to an OR gate 49, while it is also divided into a signal (B) by means of a ½ frequency divider 50 to be applied to an OR gate 51. At the same time, based on the reference switching pulse RF(A), the sampling pulse is generated in a sampling pulse generating circuit 52. More particularly, a leading edge and a trailing edge of the reference switching pulse RF(A) are detected by an edge detecting circuit 53, and a signal such as (C) is composed, and this signal (C) is delayed for a specified period in a delay circuit 54 and is conformed so that the heads may trace the center portion of the tracks. This delayed signal is indicated by (D) in FIGS. 11 and 12. In a pulse generating circuit 55, based on this delayed signal (D), a sampling pulse (E) is generated.

At the same time, depending on the discriminating output of a circuit for discriminating the recording mode mentioned below, it is selected whether to sample in the field period or to sample in the frame period in a sampling timing selecting circuit 56.

As described above, the sampling period is generally the field period, and the frame period may be used only in case of the cue reproducing in the long playing reproducing mode. Accordingly, the sampling timing selecting circuit 56 operates in the following manner. As the operator manipulates the cue reproducing switch (not shown), a high level n-multiple-H signal is applied to one of the input terminals of an AND gate 61. To the other input terminal of the AND gate 61, a signal SP-H is applied via an inverter 65. The signal SP-H is a high level signal at the time of the standard reproducing mode and is a low level at the time of the other mode, so that the high level signal is applied at the time of the long playing reproducing mode. Therefore, the AND gate 61 leads out a high level signal only in the case of the cue reproducing in the long playing reproducing mode, and changes over a switching circuit 62 to a reference switching pulse selecting side. The switching circuit 62 selects a ground terminal at other modes. In consequence, an AND gate 63 is, in other cases than the cue reproducing in the long playing reproducing mode, in ready state to be operated because the other input terminal is being applied to the high level signal. On the other hand, at the time of cue reproducing in the long playing reproducing mode, the ready state of the AND gate 63 is changed over depending on the inversion of the reference switching pulse RF. Thus, the field period or the frame period is selected.

In this connection, at the time of the recording mode, since a high level signal REP-H in the reproducing mode given to the other terminal of an AND gate 57 is not applied, the sampling pulse (F) is not output from the AND gate 57 at the time of recording.

In a selector 60, on the basis of the pulse signals (G) and (H) output from the OR gates 49 and 51, the pilot signals $f_1$ to $f_4$ are changed over when recording, and the reference signals $f_1$ to $f_4$ are changed over when reproducing, sequentially in the field unit. Also when reproducing, as the sampling pulse (F) is applied to the gates 49 and 51, the specified reference signal $f_1$ is output in an interrupting manner at the time of output of this sampling pulse (F).

The relation between outputs (G), (H) of the OR gates 49, 51 and the output (I) of the selector 60 is as shown in the table below:

TABLE

| G | H | I |
|---|---|---|
| 1 | 1 | $f_1$ |
| 0 | 1 | $f_2$ |
| 1 | 0 | $f_3$ |
| 0 | 0 | $f_4$ |

In the above description of FIG. 10, the recording pilot signals $f_1$ to $f_4$ or the mixing reference signals $f_1$ to $f_4$ were generated on the basis of the horizontal synchronizing signal $f_H$ of the video signal to be recorded or the horizontal synchronizing signal $f_H$ of the reproduced video signal, but as another method, for example, it is also possible to generate the recording pilot signals $f_1$ to $f_4$ and the mixing reference signals $f_1$ to $f_4$, by means of oscillators 58, 59 provided as shown in a circuit block diagram of FIG. 13. In this case, when it is designed to generate the pilot signals $f_1$ to $f_4$ or the reference signals $f_1$ to $f_4$, which are to be changed over in sequential order from the oscillator 58 and the frequency dividers 45 to 48, and to generate the reference signal $f_1$ for sampling to be fed at the timing of the sampling pulse (F) from the oscillator 59 and a frequency divider 66, a circuit thereof may be structured without using OR gates 49 and 51 and AND gate 57 for prohibition of time sharing changeover of the reference signal $f_1$ for sampling at the time of recording as in FIG. 10.

As the remaining construction is the same as the circuit indicated in FIG. 10, a further description thereof is omitted, by designating the same reference numerals to the identical parts.

Referring back to FIG. 9, on the basis of the sampling pulse (F) as described above, which is generated by the first variable frequency dividing circuit 31, the first switching circuit 27 is switched, and the sampled output delivered from the first switching circuit 27 is held by a holding circuit 32. A holding output from the holding circuit 32 is fed into a second low pass filter 33, and a fundamental wave in the period of 2 fields/8 fields is led out. A comparator 34 to which this fundamental wave is fed provides a high level pulse when the fundamental wave exceeds a certain level, so that a rectangular wave which rised in a period corresponding to the fundamental wave is led out.

In order to determine the rise period of the rectangular wave, the rotational detecting pulse FG of the capstan 5 is applied as a counting input into a counter 36 by means of a second variable frequency dividing circuit 35. This second variable frequency dividing circuit 35 is determined in the frequency dividing ratio depending on the multiple speed of reproducing, and at the time of n-multiple reproducing (at cue reproducing), the rotational detecting pulse FG is frequency divided by 1/n. Therefore, in the normal reproducing, the number of the rotation detecting pulses FG is directly counted by the counter 36. In the cue reproducing, the number of the 1/n divided rotational detecting pulses FG is counted by the counter 36.

On the other hand, the counter 36 is reset by an output of a reset pulse generating circuit 37 for slightly delaying the rise timing of the output of the comparator 36. Eventually, the counter 36 counts the number of the rotation detecting pulses FG in the period from one output to another of the comparator 34, or, in other words, within one period of the fundamental wave of the error signal. The number of rotational detecting pulses FG represents the number of frames. Accordingly, if for example, the counter 36 counts "1", it means one period of the fundamental wave of the error signal is 2 fields. If the count is 4, it is known that one period of the fundamental wave of the error signal is 8 fields.

As is clear from these relations, the counting output of the counter 36 is determined depending on the recording mode. More specifically, the counting output is "p" when reproducing the long playing recording mode tape in the standard reproducing mode, and is "4p" when reproducing the standard recording mode tape in the long playing reproducing mode. The final value counted by the counter 36 is decoded by a decoder 38. The output of the decoder 38 is given to a D terminal of a flip-flop 39 at the timing of the decoding of the final value. The flip-flop 39 latches the decoding output at the rise of the output of the comparator 34 when the output of the comparator 34 is given to a C terminal. The decoding output at this moment delivers the output of the high level only at nearly the finally counted value when reproducing the standard recording mode tape in the long playing reproducing mode, and remains at the low level when reproducing the long playing recording mode tape in the standard reproducing mode.

Therefore, the output of the flip-flop 39 becomes the high level when reproducing the standard recording mode tape in the long playing reproducing mode, and becomes the low level when reproducing the long playing recording mode tape in the standard reproducing mode. When the rotating speed of the capstan motor 8 (see FIG. 8) is changed over depending on this output, normal reproducing or cue reproducing adapted to the recording mode may be enlarged.

The level of the fundamental wave mentioned above, varies with the phase state of the capstan 5 (see FIG. 8). Hence, in addition to the above described manner, by amplifying the output of the second low pass filter 33 and setting low the threshold level of the comparator 34, a more stable operation is realized so that a preferable control may be feasible.

Furthermore, as admitted above, the level of the fundamental wave may become zero when the rotating pulse of the capstan falls into a special state (see $E_{LS}$ in FIG. 4, $D_{LS}$ in FIG. 7), but most of such states are momentary changes occurring in the midst of phase variation and do not matter particularly. However, even in a specified stable phase state, the level may become zero at the probability of one out of every two cases when reproducing the long play recording mode tape in the long playing reproducing mode. In such a case, it is necessary to deviate the sampling timing by one field. Accordingly, as a matter of course, it is required to change the frequency dividing phase of the first variable frequency diving by initialization means or other means when necessary.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for reproducing a video signal using a rotatable head for reproducing including at least two heads which can be alternately changed over by means of a head changeover signal, from a magnetic recording medium in which four kinds of pilot signals are each sequentially recorded in each track in superposition on a video signal sequentially recorded in each recording track disposed adjacent to each other by a helical scan method, sequentially in each field either at relatively fast standard playing speed or at relatively slow long playing speed, comprising;

transferring means for transferring said magnetic recording medium, means coupled to said transferring means for changing a transfer speed of said magnetic recording medium to either the standard playing speed or the long playing speed so as to adapt the reproducing speed to the speed at which the video signal was recorded, reproduced pilot signal generating means coupled to said rotatable head for reproducing for extracting said pilot signals from the signal reproduced by said rotatable head for providing reproduced pilot signals, reference signal generating means for sequentially providing four types of reference signals having different frequencies in response to said head changeover signal of at least two heads, said four types of reference signal being selected in the frequencies equal to those of said four types of pilot signals, level detecting means coupled to said reproduced pilot signal generating means and said reference signal generating means for mixing said reproduced pilot signal and said reference signal for providing a beat signal for detecting the level of said beat signal, tracking signal generating means coupled to said level detecting means for generating the tracking signal responsive to the output of said level detecting means, sampling signal generating means coupled to said rotatable head for reproducing for generating a sampling signal at a specified timing in each field in response to said head changeover signal, specified reference signal selecting means coupled to said sampling signal generating means, said reference signal generating means and said level detecting means for selecting the pilot signal of a specified frequency out of said pilot signals generated by said reference signal generating means during the period of generating said sampling signal in response to the output of said sampling signal generating means for transmitting it to said level detecting means, and recording mode discriminating means coupled to said sampling signal generating means, said level detecting means and said transfer speed changing means for discriminating whether the recording speed of the video signal recorded on said magnetic recording medium is the standard playing speed or the long playing speed as a function of the fundamental frequency of said beat signal provided from said level detecting means within said period of generating said sampling signal for transmitting a changeover signal to said transfer speed changing means.

2. An apparatus for reproducing a video signal as set forth in claim 1, wherein said recording mode discriminating means comprises:
means for extracting components of the fundamental wave of said beat signal, and
means for discriminating a period thereof based on said components of the extracted fundamental wave.

3. An apparatus for reproducing video signal as set forth in claim 2, wherein said apparatus for reproducing said video signal comprises a capstan for transferring said magnetic recording medium, said means for discriminating recording mode comprises means for generating a rotational detecting pulse of said capstan, and said means for discriminating the period of the fundamental wave comprises counter means for counting the number of rotational detecting pulses within one period of the fundamental wave on the basis of the output of said means for extracting components of fundamental wave and the output of said rotational detecting pulse generating means for discriminating said period of the fundamental wave.

4. An apparatus for reproducing a video signal as set forth in claim 1, wherein said sampling signal generating means is adapted to generate the sampling signal in the unit of one frame composed of two fields in said long playing reproducing mode at the long playing speed.

5. An apparatus for reproducing a video signal as set forth in claim 3, which further comprises normal/special reproducing mode selecting means for selecting the normal reproducing mode including standard playing reproducing and long playing reproducing and the special reproducing mode including fast forward reproducing and rewinding reproducing, and rotational detecting pulse frequency dividing means for frequency dividing the rotational detecting pulse generated by said rotational detecting pulse generating means responsive to the selection of the special reproducing mode by said normal/special reproducing mode selecting means.

* * * * *

UNITED STATES PATENT AND TRADEMARK OFFICE
CERTIFICATE OF CORRECTION

PATENT NO. : 4,663,673

DATED : May 5, 1987

INVENTOR(S) : NOBUHIDE DOUTSUBO

It is certified that error appears in the above-identified patent and that said Letters Patent is hereby corrected as shown below:

On the cover page, Item [30], delete in its entirety.

Signed and Sealed this

Eleventh Day of August, 1987

*Attest:*

DONALD J. QUIGG

*Attesting Officer*     *Commissioner of Patents and Trademarks*